United States Patent
Eckstein et al.

(10) Patent No.: US 7,081,818 B2
(45) Date of Patent: Jul. 25, 2006

(54) ARTICLE IDENTIFICATION AND TRACKING USING ELECTRONIC SHADOWS CREATED BY RFID TAGS

(75) Inventors: Eric Eckstein, Merion Station, PA (US); Gary T. Mazoki, Sewell, NJ (US); William S. Richie, Jr., Pennsville, NJ (US)

(73) Assignee: Checkpoint Systems, Inc., Thorofare, NJ (US)

( * ) Notice: Subject to any disclaimer, the term of this patent is extended or adjusted under 35 U.S.C. 154(b) by 141 days.

(21) Appl. No.: 10/847,129

(22) Filed: May 17, 2004

(65) Prior Publication Data

US 2005/0012613 A1 Jan. 20, 2005

Related U.S. Application Data

(60) Provisional application No. 60/471,885, filed on May 19, 2003.

(51) Int. Cl.
*G08B 13/14* (2006.01)

(52) U.S. Cl. .............................. 340/572.1; 340/572.4; 340/539.1; 340/539.13; 340/825.49; 340/825.69

(58) Field of Classification Search ............ 340/572.1, 340/572.4, 539.1, 539.13, 568.1, 825.49, 340/825.69, 10.1, 521, 522, 10.4, 10.41
See application file for complete search history.

(56) References Cited

U.S. PATENT DOCUMENTS

| | | | | |
|---|---|---|---|---|
| 6,154,137 A * | 11/2000 | Goff et al. | ................ | 340/572.4 |
| 6,297,734 B1 * | 10/2001 | Richardson et al. | ... | 340/539.26 |
| 6,307,475 B1 * | 10/2001 | Kelley | ..................... | 340/573.1 |
| 6,600,418 B1 * | 7/2003 | Francis et al. | ........... | 340/572.1 |

FOREIGN PATENT DOCUMENTS

| WO | WO 01 06434 A | 1/2001 |
|---|---|---|
| WO | WO 02 33511 A | 4/2002 |

* cited by examiner

*Primary Examiner*—Hung Nguyen
(74) *Attorney, Agent, or Firm*—Caesar, Rivise, Bernstein, Cohen & Pokotilow, Ltd.

(57) ABSTRACT

A tracking system uses RFID (radio frequency identification) tag technology to facilitate the identification and tracking of items in an environment through a technique known as shadowing. As an object or target moves within a pre-described detection zone with communicating antenna and RFID sensors, the object or target blocks the line of sight between respective antenna and sensors, preventing electromagnetic coupling between the sensor and the antenna and thus casting an electromagnetic shadow along the line of sight. One approach of this invention uses this shadow technique to perform functions such as theft (shrink) deterrence/detection; tracking the motion of objects through an environment by monitoring the shadow; and correlation analysis of people shadows to tagged items (e.g., merchandise, articles) to foster marketing and merchandizing effectiveness.

30 Claims, 2 Drawing Sheets

ARTICLE IDENTIFICATION AND TRACKING USING ELECTRONIC SHADOWS CREATED BY RFID TAGS

CROSS-REFERENCE TO RELATED APPLICATIONS

This application is a Nonprovisional of U.S. Provisional Application Ser. No. 60/471,885 filed May 19, 2003, and entitled "Article Identification and Tracking using Electronic Shadows Created by RFID Tags."

FIELD OF INVENTION

This invention relates to radio frequency identification (RFID) technology and, in particular, to RFID security systems having the capability to non-invasively detect and track an object within a security zone based on a loss of information.

BACKGROUND OF THE INVENTION

Retailers focusing on loss prevention (e.g. theft) traditionally have three approaches to minimize loss: (1) anchoring the merchandise in place (e.g., attaching cables to the merchandise, putting articles in display cases and behind the counter); (2) using video surveillance systems and/or security guards to watch everyone in the store; and (3) using an alarm system with special tags attached to items that sounds off an alarm whenever a shoplifter tries to leave with a tagged item. Anchoring the merchandise in place makes it difficult for shoppers to examine items and try on garments. Customers have to wait for a clerk to release the item so the customer can try it on or look at it. This inconvenience motivates shoppers to shop at stores where the merchandise is more accessible. In addition, anchoring merchandise is costly as a store must provide labor just to release the merchandise. Video surveillance systems including monitoring devices, observation mirrors and security cards were among the earliest approaches to combat shoplifting. However, the cost of labor is expensive and the surveillance systems can be intrusive, especially in areas (e.g. dressing rooms) where shoppers would prefer some level of privacy.

Radio frequency (RF) Tagging security systems are useful anywhere there is an opportunity for theft of items of any size. Using tagging technology (e.g., electronic article security (EAS), radio frequency identification (RFID)) enables a retailer to display popular items on the floor, where they can be seen, rather than putting them in locked cases or behind the counter. The use of EAS and RFID systems for detecting and preventing theft or unauthorized removal of articles or goods from facilities has become widespread. In general, such systems have RF antennas that detect resonant tags attached to articles in a security or detection zone of the antennas. Such systems are generally located at or around points of exit to detect the security tag, and thus the article, as it transits through the exit point.

EAS systems are limited by the capabilities of their tags. Unfortunately, EAS tags contain no information. They are simply there or not there. Tag systems designed to add information to RF tags use radio frequency identification (RFID) technologies to read information from RFID tags. RFID tags can store information about the product as well as uniquely identify each of the products. Unfortunately, RFID systems encounter problems of obstruction or improper disorientation. In RFID technology, antennas and tags communicate with each other along a line of sight as antennas send integration signals and read response signals from the tags. RFID signals are blocked, absorbed or reflected or otherwise modified by conductive objects, including people. An RFID tag passing through a sensor net or detection zone of RFID antennas may not be detected by the antennas if the direct path between the tag and antennas is blocked. That is, a person can easily hide a tag so that it is not seen (e.g., read, detected) by the RFID system. The person hiding the tag can walk through the RFID system's detection zones without sounding an alarm and the system has no way to locate the loss tag or its associated article. If a RFID tag is hidden, it can not be identified or tracked with known tagging systems. A possible approach is combining the RFID system with a video surveillance system, which could follow a person associated with a hidden or lost tag in real-time. However, this approach is expensive and invasive. Accordingly, there is a need for systems which can non-invasively track tagged products regardless of whether the tag can be seen. Moreover, it would beneficial to provide a system that could non-invasively identify and track moving objects without video surveillance.

Warehouses are using RF tagging technology with resonant tags located in the floor and matrix portable readers on forklifts for inventory purposes. Automotive vehicle systems have used RF tagging technology with resonant tags embedded in the road to help steer vehicles. As a vehicle travels down a road, an antenna on the vehicle identifies the embedded tags as markers to approach or stay to one side of to help the vehicle stay in a lane. However, neither of these approaches has solved the need to non-invasively identify and track moving objects.

BRIEF SUMMARY OF THE INVENTION

The preferred embodiments of the present invention specifically relate to the fields of security, RFID, marketing and retail. Other embodiments of the present invention may be applied to applications such as warehousing and distribution systems, manufacturing floor environments and people counting. The present invention uses passive RFID (radio frequency identification) tag technology to facilitate the identification and tracking of items in an environment through a technique known as shadowing. One approach of this invention uses this shadow technique to perform functions such as theft (shrink) deterrence/detection; tracking the motion of objects through an environment by monitoring the shadow; and correlation analysis of people shadows to tagged items (e.g., merchandise, articles) to foster marketing and merchandising effectiveness.

Certain terminology is used herein for convenience only and is not to be taken as a limitation on the present invention.

The term antenna described in the preferred embodiments herein generally refers to a circuit that couples from one device (e.g., an identification sensor or tag) to itself with the intent of transferring energy and receiving data back. Such antennas include RFID readers or interrogators that communicate with RFID sensors by interactive (inductive or radiated) coupling, as is well-known in the art. While not being limited to a particular theory, an RFID reader or interrogator generally includes a transmitter and a receiver that communicate with RFID sensors along a line of sight therebetween by sending interrogation signals to the sensors and reading response signals from the sensors. Of course, other antenna designs could also be used with the present invention, and the invention is not limited to the particular antenna described. In other words, the term antenna as used in this invention refers to interrogators and readers that communicate with responsive sensors or tags at frequencies in the MHz, GHz, THz, ionizing and non-ionizing radiation as readily understood by a skilled artisan.

The term RFID sensor as described in the preferred embodiments herein includes a passive, semi active or active (battery powered) RFID tag. RFID tags are one type of well-known identification tags in the art and typically include a responsive circuit (e.g., a passive resonant radio frequency (RF) circuit, a dipole circuit, a patch circuit) for use in detecting when the tag is within a zone that is monitored by a reader or interrogator, as is well-known in the art. One well-known type of passive resonant RF circuit has a coil antenna and a capacitor which together form an LC circuit with a predetermined resonant frequency. Power for the sensor is typically derived in a conventional manner (e.g., from energy received at the coil antenna from an interrogation signal). Preferably, each sensor has a unique identification or serial number for identifying the individual sensor. This unique identification is sent within a response signal returned upon receipt of the interrogation signal to be read by a respective reader. Of course, other tag designs could also be used with the present invention, and the invention is not limited to the particular sensor described. For example, any identification (ID) sensor, defined as a responsive circuit, including RFID tags, dipole tags and patch antennas, could be included within the scope of the invention. According, RFID tags, RFID sensors, dipole tags and patch antennas are examples of ID sensors that are within the scope of the invention.

The term shadow or electronic shadow as defined in the preferred embodiments herein refers to the absence of detection for a known RFID sensor. As an object or target moves within a pre-described sensor net environment of a volumetric security or detection zone with communicating antenna and RFID sensors, the object or target blocks the line of sight between respective antenna and sensors, preventing electromagnetic coupling between the sensor and the antenna and thus casting an electromagnetic shadow along the line of sight. For example, a person walking over a floor mounted sensor blocks the detection of the RFID sensor, thereby creating an electronic shadow. That is, the person standing above an RFID sensor will cause signal absorption, reflection and attenuation, which prevents a read of the RFID sensor by an associated antenna. The series of electronic shadows (the real time sequence of electronic shadows) can identify the vector movement of people within a volumetric detection zone.

According to a preferred embodiment of the invention, a tracking system includes a RFID sensor, an antenna and a processing member. The RFID sensor has a resonant radio frequency (RF) circuit and is positioned at a first location. The antenna is positioned at a second location and is adapted to detect the RFID sensor by interactive coupling between the antenna and the RFID sensor via communication signals therebetween. The processing member is adapted to determine an absence of detection of the RFID sensor by the antenna, interpret the absence of detection as indicia of an electronic shadow between the first location and the second location, and infer a presence of an object as cause for the electronic shadow.

As described by example below, a preferred embodiment of the tracking system includes an approach for communicating signals along a line of sight between a first location and a second location, for detecting the communicated signals at the second location, for determining an absence of detection of one of the communicated signals at the second location, for interpreting the absence of detection as indicia of a shadow between the first location and the second location, and for inferring a presence of an object as cause for the shadow.

The preferred embodiment of the invention is also described as a method for targeting an object including the steps of communicating signals along a line of sight between a first location and a second location, detecting the communicated signals at the second location, determining an absence of detection of one of the communicated signals at the second location, interpreting the absence of detection as indicia of a shadow between the first location and the second location, and inferring a presence of the object as cause for the shadow.

Further scope of applicability of the present invention will become apparent from the detailed description given hereinafter. However, it should be understood that the detailed description and specific examples, while indicating preferred embodiments of the invention, are given by way of illustration only, and that the invention is not limited to the precise arrangements and instrumentalities shown, since the invention will become apparent to those skilled in the art from this detailed description.

BRIEF DESCRIPTION OF SEVERAL VIEWS OF THE DRAWINGS

The following detailed description of preferred embodiments of the invention will be better understood when read in conjunction with the following drawings, in which like-referenced numerals designate like elements, and wherein.

DETAILED DESCRIPTION OF THE INVENTION

Figure 1:
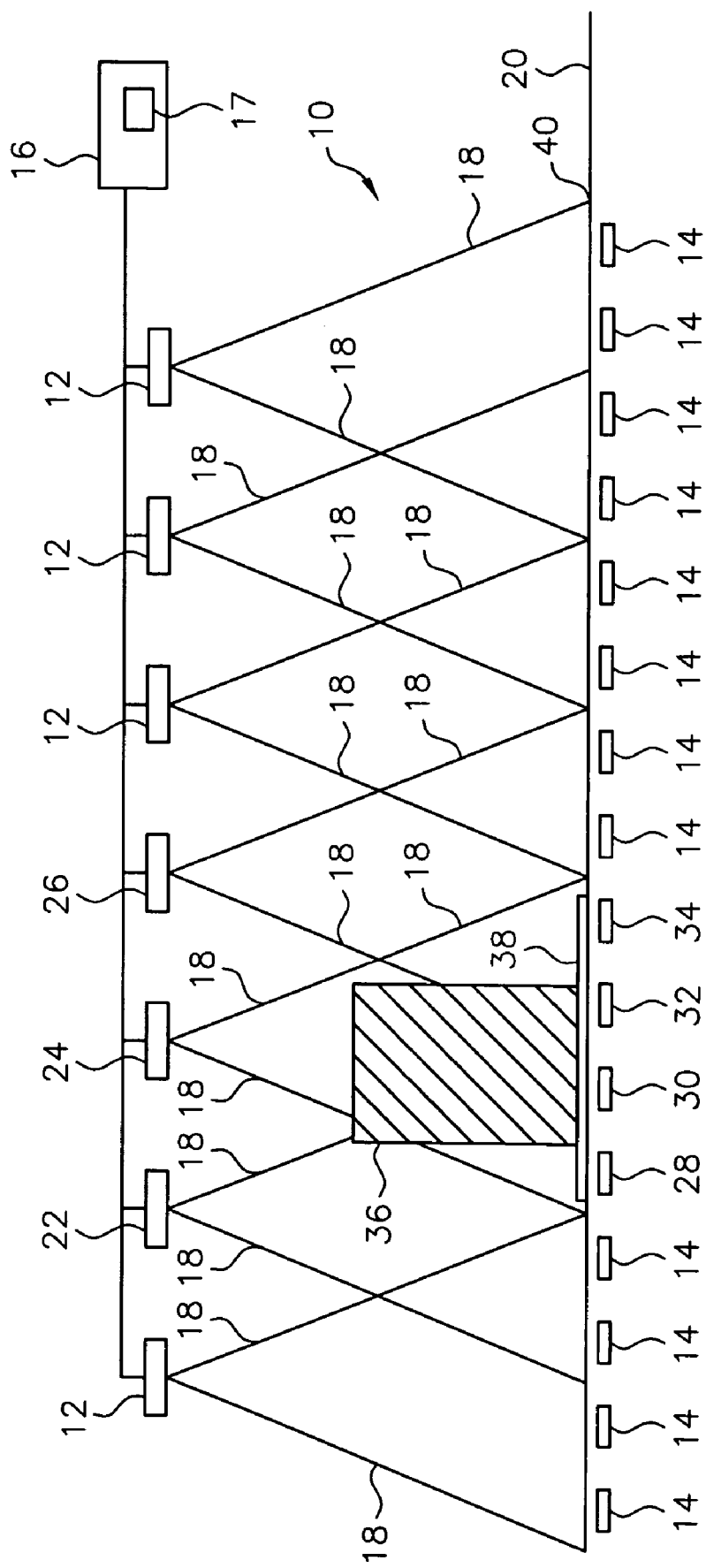
FIG. 1 is a plan view of antenna coverage and overlapping detection regions that create a Sensor Net in accordance with a preferred embodiment of the present invention.

While not being limited to a particular theory, the present invention is described in a system using Ultra High Frequency (UHF) RFID interrogators, antennas and tags (sensors), preferably operating at frequencies between 800 MHz and 1 GHz. However, the scope of the present invention includes interrogators, antennas and tags that operate at other frequencies (e.g., MHz, GHz, THz) that have similar electromagnetic properties in the area of signal absorption, reflection and attenuation with conductive, semi-conductive and high moisture content objects (including humans and animals) and including ionizing and non-ionizing radiation. In theory, the higher the frequency, the better the system works. As the frequency gets higher, the wavelength gets shorter as the shadows become more defined. Moreover the antennas and sensors can be made smaller for higher frequency bands.

The electronic shadow tracking system of the present invention (hereinafter also referred to as tracking system) allows a computer program to map an area (e.g., a floor of a retail store, transportation center, convention center, warehouse, distribution center) by using RFID tags placed in a geometric pattern on the floor (fixed RFID sensors) and read by antennas placed in the ceiling, and/or on the walls or even in or on pedestals. Fixed RFID sensors may also be attached to store fixtures, racks or point of sale counters to identify and/or locate such objects. In addition to fixed RFID sensors, there may also be mobile RFID sensors attached to movable items within the environment that allow the tracking system to also identify articles, objects or persons attached to the mobile sensors. For example, the mobile RFID sensors may be attached to products being sold in a retail store or may be in the form of an employee badge to identify personnel working in the store. According to the preferred embodiments, a computer program can use RFID sensors and antennas to map an area, also referred to as a sensor net, detection zone or security zone at various locations, where it is desirable to track goods and/or people, such as, for example, a warehouse, airport, train station, subway station, bus station, stadium, convention center, and anywhere along a product distribution line.

Generally, as communication signals (e.g., interrogation signals, response signals) are blocked by a shadow causing object, the blocked communication signals are not read by the respective antenna or RFID sensor, thereby indicating the presence of the shadow causing object in the line of sight between the antenna and RFID sensor. When an antenna does not receive an expected response signal from its interrogation signal, the tracking system infers the presence of the shadow causing object and maps an electronic shadow along the blocked line of sight.

The computer program knows the location and geometry of the fixed RFID sensors and antennas. With a single antenna, and repeated continuous periodic communication between the antenna and sensors, the computer program can determine movement of a shadow causing object, based on the location of the resulting shadow. With multiple antennas, and knowledge of the location and geometry of the antennas and fixed RFID sensors, the computer program can estimate the size of the shadow causing object, as described in greater detail below. If the tracking system of the preferred embodiments determines that a tagged article is associated with a shadow (e.g., the tagged article moves with the shadow, the tagged article becomes blocked or disabled and an associated shadow remains) then the computer program can track the article with the shadow, and thus know where the article is located.

Accordingly, this tracking system provides the benefit of gaining knowledge from the absence of knowledge. That is, before this invention, a security system would not know what happened or where a tagged item moved, especially if the tag was blocked or disabled, without the aid and extra cost of a visual monitoring system (i.e., cameras, monitors, personnel). However, in accordance with the preferred embodiments of this invention, the tracking system non-invasively tracks movement of a shadow causing object (e.g., person, cart, carrier, luggage, box, foil-lined bag, etc) as desired (e.g., associated with a tagged article, passing through a detection zone, getting on a train, moving on a conveyer belt, moving through distribution ports and channels). The tracking is non-invasive at least because the tracking system does not actually see or visually monitor people. Instead, the tracking system monitors the electronic shadow cast by the person or object. The tracking system does not discriminate, distinguish, nor profile according to race, religion, creed, national origin, gender or size independent criteria since it does not see external characteristics of any person. The tracking system can estimate the size of a shadow causing object (e.g., person) which could be helpful, for example, if trying to locate a small child.

An example of a mobile RFID sensor is a plastic hard tag attached to a garment. Within the plastic hard tag is an RFID inlay (antenna and RFID read only or read write chip) and, optionally, an EAS sensor. Fixed RFID sensors are structurally the same or substantially the same as mobile RFID sensors well-known in the art, but are spread about an environment to be seen by the antenna on a regular and periodic basis. While not being limited to a particular theory, the fixed RFID sensors are preferably at least one wavelength apart (e.g., about one foot apart). While not being limited to a particular theory, one antenna located in a ceiling generally has an area of detection of about three meters squared on a floor below. If more than one antenna is desired, it is preferred to position additional antennas so that their areas of detection overlap. The amount of overlap should increase, that is, the antennas should be positioned closer together, if greater resolution of shadow causing objects is desired. In other words, by placing antennas so that each RFID sensor can be detected by more than one antenna, the shape of the shadow causing object can be estimated according to the shadows detected by each antenna from the particular object.

The antennas are preferably placed in or on the ceiling, walls or pedestals to form a volumetric detection or security zone with the fixed RFID sensors placed in the floor, the walls or some other fixed structure. This volumetric detection zone, which is also referred to as a sensor net, may consist of an entire retail store, or may just be a controlled corral area within a store. For people counting, the volumetric detection zone may include the entrance and exit zones or regions.

As a preferred approach for implementing the present invention, antennas are installed in a retail store such that either the entire contents, or merely the content that needs to be monitored, is within a substantially contiguous field of detection, herewith referred to as a sensor net. In order to construct a sensor net, RFID Tags are placed on/in enough surfaces (floors and/or walls) such that the antennas in the sensor net can see (e.g., read response signals from) the sensors. Within the sensor net, the tags and antennas may be positioned in a geometric matrix having a distance between the antennas (and between the sensors) in accordance with the amount of resolution desired; the greater the geometric density of the tags and antennas, the finer the resolution of the shadows. The position of the tags and antennas is known so the system has an initial map of the environment defined by the sensor net. It is understood that while the preferred embodiment of the invention is generally described in conjunction with a retail store, that the embodiments of the invention are not limited to a retail store environment, but are applicable to various environments where it is desirable to track goods and/or people, such as, for example, a warehouse, airport, train station, subway station, bus station, stadium, convention center, transportation center, museum, or anywhere along a product distribution line.

Figure 2:
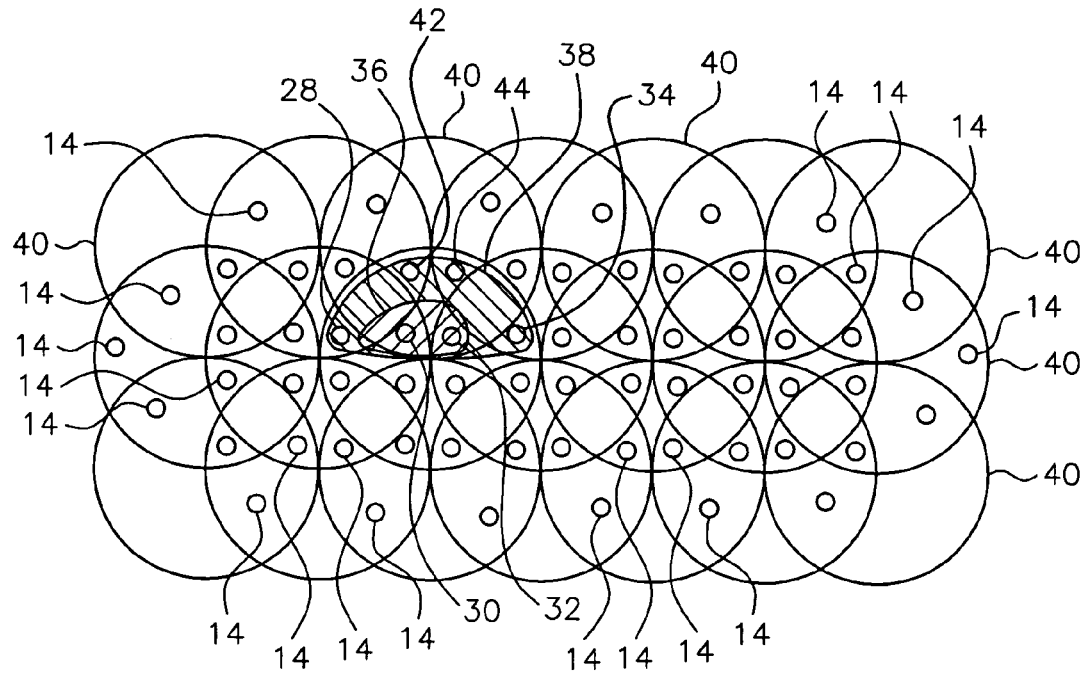
FIG. 2 is an elevation view of a sensor net of antenna coverage similar to the sensor net shown in FIG. 1.
Figure 3:
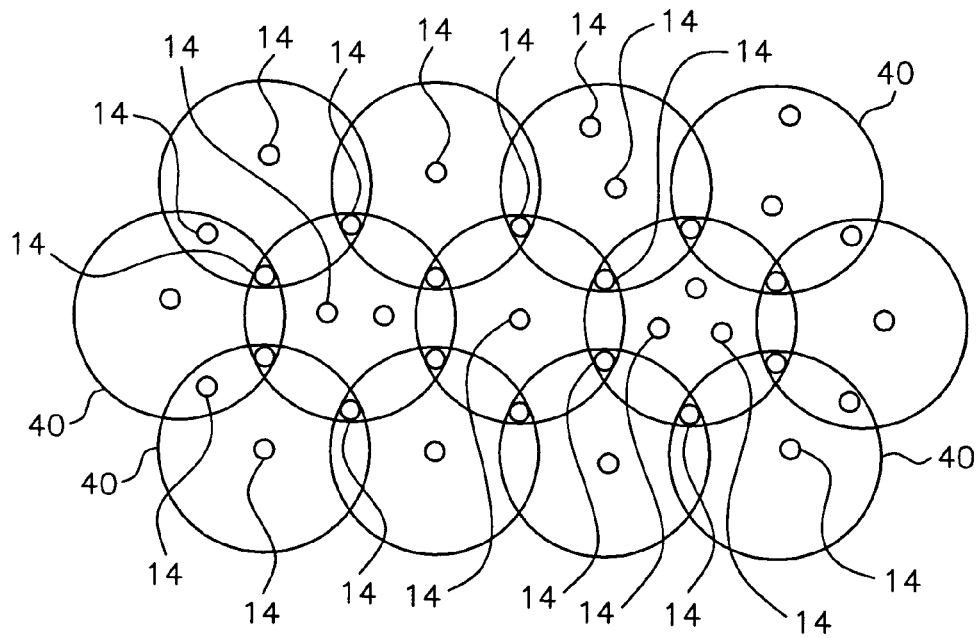
FIG. 3 is an elevation view illustrating another sensor net in accordance with the preferred embodiments.

FIGS. 1–3 illustrate Sensor Nets (e.g., detection zones) and how shadows form. Referring to FIG. 1, a tracking system in accordance with the preferred embodiments is illustrated by example at 10. The tracking system 10 includes antennas 12, RFID sensors 14 and a processing member (e.g., computer 16, computer program 17). While not being limited to a particular theory, the antenna 12 and RFID sensors 14 are preferably the same structure as well-known antenna and RFID tags, but are spread about an environment to form a detection zone. That is, the antennas 12 (also known as interrogators) are preferably fixed and placed in or near a ceiling or another structure (e.g., wall, pedestal, columns, etc.) as is readily understood in the art. The RFID sensors 14 are preferably fixed under the floor within the detection zone to be seen by the antennas 12. The RFID sensors 14 can also be placed in or on walls, columns, tables, or other structure within the detection zone. Both the antennas 12 and the sensors 14 are preferably fixed so that the tracking system 10 knows where the antenna and sensors are, which is critical for determining the location of articles and objects within the detection zone. In other words, the system 10 knows the map of the environment (e.g., sensor net detection zone) created by the antennas 12 and tags 14. This mapping gives the system 10 knowledge of the environment so that upon the loss of information (e.g., the non-detection of an expected signal) the system can determine the location of a shadow and its associated shadow causing object.

Regardless of their location in the detection zone, the antennas 12 and sensors 14 are positioned to detect electromagnetic shadow causing objects within the zone. The antennas 12 are also arranged to detect mobile RFID tags that are not magnetically blocked within the detection zone. As such, RFID tags may be attached to an article for sale, store personnel, or merchandise containers as readily understood by a skilled artisan.

The computer 16 is electrically coupled to an output of each antenna 12 for interpreting and processing the response signals received or expected but not received from the RFID sensors 14 and other RFID tags in the detection zone. The results are interpreted by the computer program 17 (e.g., software, middleware, firmware, application) integrated with the computer 16 for determining the presence of objects within the detection zone. Each RFID sensor 14 is positioned so it generally communicates with at least one antenna 12. As can be seen in FIG. 1, each antenna 12 is arranged to interrogate and read RF signals over a generally cone shaped volumetric area generally defined, for example, by field of view borders 18 associated with each respective antenna. Each antenna 12 is configured to see RFID sensors 14 located within the antenna's communication range, which can be identified in FIG. 1 as the cone-shaped volumetric regions defined by the field of view borders 18, assuming that the antenna can see the RFID sensor by an unobstructed line of sight therebetween.

It is understood that the computer 16 and computer program 17 are shown as an example of a processing member and that other processing member designs, including computers and programs alone or in combination with other computers, networks, or programs, could also be used with the present invention, and the invention is not limited to the particular processing member described. It is also understood that the computer 16 and computer program 17 are coupled to the antennas 12 in any way that permits the computer and computer program to access the communication results of the antennas. Accordingly, the computer 16 and computer program 17 are adapted to access the readings of the antennas 12 and can be coupled to the system in a wired or wireless configuration as understood by as skilled artisan.

According to the view shown in FIG. 1, each antenna 12 can see four of the RFID sensors 14 mounted under a floor 20. It is understood that the invention is not limited to a particular number of sensors per antenna, as the number may be determined from many factors, including the level of resolution desired for the shadow causing object, the distance between the antennas 12 and RFID sensors 14, and the wavelength of the interrogation signal. As long as the sensors 14 are working and no object is blocking the line of sight between a respective antenna 12 and sensor, then the antenna and sensor are able to communicate in a manner well know in the art. For example, an antenna 12 transmits an interrogation signal toward the RFID sensors 14 in the antenna's region of view. The sensors 14 that receive the interrogation signal resonate, returning a response signal with the sensor's identification back to the antenna 12. Since the tracking system 10, and in particular, the computer program 17 (e.g., software processing the communications) knows the detection zone environment, and thus knows the location of each antenna 12 and sensor 14, then the tracking system can locate the line of sight between each antenna and sensor. If a sensor 14 in a respective antenna's detection zone returns a response signal that is received by the interrogating antenna 12, then the tracking system 10 knows that no blocking object was present between the respective antenna and sensor during the communication period. However, if the antenna 12 does not receive a response signal from a sensor 14 in its detection zone, then the tracking system 10 derives that an object is blocking the line of sight between the respective antenna and sensor.

Accordingly, from the loss of information (e.g., no response signal received by the antenna) the tracking system 10 gains information by recognizing that an object is blocking the communication path between the respective antenna 12 and sensor 14. This loss of information creates an electronic shadow along the respective line of communication. Preferably, each RFID sensor 14 is positioned within the detection zone of more than one antenna 12, which allows the tracking system 10 to estimate the size of the signal blocking object, by analyzing the shadows cast by the object. As the antennas 12 repeatedly and continuously send out interrogation signals and read corresponding response signals, the tracking system 10 can track movement of a signal blocking object in real time based on the RFID sensors 14 seen (e.g. response signal read) and not seen (e.g., signal blocked) by the antennas 12.

FIG. 1 illustrates an example of a shadow. If FIG. 1, three of the antennas are identified having reference numerals 22, 24 and 26; and four of the RFID sensors are identified having reference numerals 28, 30, 32, and 34, respectively. The antennas 22, 24 and 26 are identical to the antennas 12 discussed above, with each antenna having a unique identification. Likewise, the RFID sensors 28, 30, 32 and 34 are identical to the RFID sensors 14, with each sensor having a unique identification. Still referring to FIG. 1, a shadow causing object 36 is shown on the floor 20 above sensors 30 and 32. The shadow causing object 36 represents any object that blocks communication between the antennas 12, 22, 24, 26 and RFID sensors 14, 28, 30, 32, 34.

In the example embodiment illustrated in FIG. 1, antennas 12, 22, 24 and 26 transmit interrogation signals to alert the associated RFID sensors 14, 28, 30, 32, and 34 in their field of view. If the interrogation signals and corresponding response signals are received as expected, then no shadow occurs. However, if an antenna 12, 22, 24, 26 does not receive a corresponding response signal to its transmitted interrogation signal, then the tracking system infers a shadow along the line of sight between the corresponding antenna and sensor. As can be seen in FIG. 1, the shadow causing object 36 casts an electronic shadow 38 over and between RFID sensors 28, 30, 32 and 34. No shadow is formed over the RFID sensors 14 since there is no shadow causing object between any of the RFID sensors 14 and the antennas 12. However, antenna 22 does not receive a response signal from sensor 30, antenna 24 does not receive a response signal from sensors 28, 30, 32 and 34, and antenna 26 does not receive a response signal from sensor 32. Therefore the system 10 identifies the shadow 38 as being formed on the floor 20 over and between RFID sensors 28, 30, 32 and 34.

Preferably, the antenna and RFID sensors are positioned so that each sensor is in the field of view of more than one antenna. This allows the tracking system 10 to better estimate the size of the shadow causing object 36. For example, still referring to FIG. 1, RFID sensor 28 is in the field of view of antennas 22 and 24. With the shadow causing object 36 positioned as shown in FIG. 1, antenna 22 can see sensor 28 (e.g., antenna 22 receives a corresponding response signal from sensor 28). However, antenna 24 can not see sensor 28 because the shadow causing object 36 blocks communication therebetween. Therefore shadow 38 extends over RFID sensor 28 as the tracking system 10 gains the knowledge that the shadow causing object 36 is large enough to block line of sight communication between antenna 24 and sensor 28. The tracking system 10 also gains information that the shadow causing object 36 does not cover the RFID sensor 28 and does not block the line of sight between the antenna 22 and the sensor 28. Since the RFID sensor 28 is within the field of view of antennas 22 and 24, but can only be seen by antenna 22, the tracking system 10, via the computer program 17, is able to better estimate the size of the shadow causing object 36 as having a height sufficient to block communication between antenna 24 and sensor 28, but not extending over sensor 28. RFID sensor 30 can not been seen by its corresponding antennas 22 and 24, thus allowing the tracking system 10 to presume that the shadow causing object 36 is located over the sensor 30. Similarly, RFID sensor 32 can not be seen by its associated antennas 24 and 26, thereby allowing the tracking system 10 to presume that the shadow causing object 36 is also located over the sensor 32. RFID sensor 34 can not be seen by one of its corresponding antennas 24, but can be seen by another of its corresponding antennas 26. From this information, the tracking system 10 can determine that the shadow 38 extends over the sensor 34 but that the shadow causing object 36 does not extend over the sensor 34 or block the line of sight between the sensor 34 and the antenna 26. Accordingly, the tracking system 10 via the computer program 17 can locate and estimate the size of the shadow causing object 36 as having a height sufficient to block the line of sight between antenna 24 and RFID sensors 28 and 34, and also as having a footprint smaller than its shadow 38.

In a similar manner, the tracking system 10 can locate an unblocked mobile RFID sensor according to the antennas 12, 22, 24 and 26 that detect the unblocked sensor, as understood by a skilled artisan. For example, an unblocked mobile sensor detected by antennas 22 and 24 would be located within the detection zones of the detecting antennas 22 and 24.

Since the tracking system 10 is constructed to periodically communicate between the antennas and sensors, the tracking system can track movement of the shadow causing object 36 over time. In other words, the tracking system 10 can track people, vehicles, inventory, products, etc. as desired depending on the application. Likewise, the tracking system 10 can track tagged (e.g., having a mobile active or disabled sensor) merchandise and associate the merchandise with the shadow causing object 36 if appropriate. Based on the movement of the shadow causing object 36, and the shadow's association with unpurchased merchandise, the tracking system 10 can be used to send alarms or otherwise notify personnel of floor activity as desired.

FIG. 2 is a top view, partially in section, of the tracking system 10 shown in FIG. 1, in accordance with the preferred embodiments of the invention. In particular, FIG. 2 illustrates an exemplary floor plan for placement of the RFID sensors 14 under a floor. FIG. 2 also shows field of view circles 40, with each field of view circle outlining an area of a floor seen by a respective antenna 12 placed above the floor and preferably adjacent a ceiling over the floor. For example, the field of view circles 40 indicate the intersection of the field of view boarders 18 and the floor 20 shown in FIG. 1. As can be seen in FIG. 2, each antenna 12 is preferably located and oriented to be able to see a plurality of RFID sensors 14, and each sensor is arranged so that it can be seen or identified by more than one antenna.

Still referring to FIG. 2, the shadow causing object 36 blocks communication between the antennas and sensors 28, 30, 32 and 34 to cause a shadow 38. However, in a method similar to as described above for FIG. 1, the tracking system 10 can estimate the size of the shadow causing object 36 by triangulating on the RFID sensors that are not seen by their respective antennas. Using this approach, the computer program can determine that the shadow causing object has a footprint large enough to cover only RFID sensors 30 and 32, and has a height that blocks communication between other antennas 28, 34, 42 and 44. When used over time, the tracking system 10 can non-invasively track movement of the shadow causing object 36 within the sensor net of detection zones defined by the location and configuration of the antennas and sensors.

It is understood that the antennas and sensors can be arranged further apart or closer together, depending on the level of resolution desired for the application of the tracking system 10. If less resolution is desired, for example, where the tracking system 10 is able to identify and track a shadow causing object 36 but not overly concerned about the dimensions of the object, then the antenna 12 and sensors 14 can be spread farther apart. Further, if a greater level of resolution is desired to better identify each shadow causing object 36, then the antenna 12 and sensors 14 may be placed closely together such that each sensor can be viewed by a plurality of antenna to precisely determine the size and shape of the shadow causing object.

FIG. 3 is a top view similar to FIG. 2 but showing a tracking system 10 in accordance with the preferred embodiments having its antennas and sensors spread farther apart than in the examples shown in FIGS. 1 and 2. As can be seen in FIG. 3, some of the RFID sensors 14 can be seen by a plurality of antennas while others may only be seen by one antenna. This spacing allows the tracking system 10 to identify and track a shadow causing object, but depending on the size of the shadow causing object, the tracking system 10 may not be able to identify the shadow causing object with the same resolution or as detailed as is determinable from the embodiment shown in FIGS. 1 and 2. For example, if a shadow causing object is small enough to block communication between only one sensor and antenna, then the tracking system can not estimate the size of the shadow causing object within the shadow. However, as the shadow causing object moves within the safety sensor net, it will cause a shadow over RFID sensors that can be seen by more than one antenna, allowing for a better estimate of the size of the shadow causing object. Accordingly, over time, as the shadow causing object moves within the security net, the tracking system 10 can still estimate the size and shape of the shadow causing object.

The combination of electronic shadow vectors, along with the detection of mobile RFID sensors and their respective vector motion, creates an electronic mapping fingerprint. Electronic mapping fingerprints may also be the summation of electronic shadow vectors, with or without mobile RFID sensors, as is described in greater detail herein. A computer program analyzed the electronic mapping fingerprint as desired and provides security, marketing and logistics functions, sample uses of which include the following:

EXAMPLE 1

Loss Prevention

Electronic mapping and electronic shadows may be used to determine the vector motion/direction (e.g. towards the exit of the store or towards the point of sale—cash register) and velocity (speed) of a customer in a retail store. By combining this information with the knowledge of a product in the possession of the customer (e.g., exact type, quantity, value), it may be determined if the product is likely being stolen. In particular, motion of a shadow with non-purchased goods towards an exit may indicate an attempted theft, especially if the shadow/tag does not go past a point-of-sale. This sequence of information and events could signal a store employee to approach the customer before exiting the store and thereby prevent a likely shoplifting event. The preferred tracking system of the invention can also detect theft upon a sudden loss of a tagged product (e.g., foil-lined bag, baby carriage, shopping bag, removed tag) in association with a shadow. In this situation, the tag disappears in relationship to a shadow, but the preferred tracking system can track the shadow associated with the loss tag. These examples of loss prevention are useful in dressing room areas, where tags are disabled and an associated customer leaves. The preferred tracking system of the invention is alerted by the sudden loss of the tag and can track the shadow caused by the associated customer. Detection zones in accordance with the preferred embodiments can also be placed, for example, at point-of-sale locations (e.g., cash or check-out registers) to detect swipe control and/or monitor traffic. One example of swipe control is where an employee at a point-of-sale does not scan all of the products into the register for sale. Even if the tags on the unscanned products are disabled, the tracking system can still track the shadow associated with the products. That is, when a tag disappears, the tracking system 10 can still track the shadow associated with the lost tag.

EXAMPLE 2

Cross Merchandising (e.g., Complementary Product Selections)

By using the same information as in Example 1 (e.g., vector/motion direction of customer and the knowledge of the products in hand by the customer), if the customer's vector direction is the point of sale cash register, this knowledge and information can be used to automatically display to the customer (via a well-known display system in the queue for checkout) or to prompt a sales employee to suggest an array of complimentary products that match the customer-selected items. As another demonstration of cross merchandising, when a customer, identified as a shadow, enters a dressing room, the tracking system in accordance with the preferred embodiments can advertise goods associated with the tagged merchandise brought into the dressing room with the customer on a well-known display device located in the dressing room. The computer program in accordance with the invention can match the merchandise brought into the dressing room with complementary products, and market the complementary products to the customer in the privacy of the dressing room. This marketing approach is more focused and personal than general advertisements elsewhere in the store, because the advertisement is shared only with the customer in the changing room, where the customer can personally consider the products advertised without public concerns or pressures. The advertisements are based on the tagged products that the customer has shown an interest in by taking the products into the dressing room. Accordingly, the tracking system provides a focused non-invasive marketing tool or personal shopper for a customer without people watching machines or store personnel.

EXAMPLE 3

Customer Flow/Plan-a-Gram/in Store Marketing

Based on the electronic shadow of customers and the reference map of fixed RFID sensors on stationary store fixtures and/or in the floor, a trend analysis can be established to understand customer flow. This trend analysis can allow merchandising to optimize customer flow within the store.

This same scenario, along with the markdown racks and/or store marketing, can also establish trend analysis to optimize messaging and markdown locations within the retail environment. By combining this information with the knowledge of the products in the hand or before a customer, trend analysis can also be established based on, for example, the amount of time the customer considers a product and the percentage of times that the customer purchases considered products.

The correct products in the correct locations can improve sales throughput. The ability to electronically verify exact product and type can be used to monitor inventory/location and take corrective action based on established sales rules.

EXAMPLE 4

People Counter

The use of electronic shadows at the exit/entrance of a retail store can provide an accurate people count and real time history database. The value of people count and real time information can provide a measure of advertising campaigns. A tracking system in accordance with the preferred embodiments can also provide an accurate people count at other locations where it is desirable to know such information, such as, for example, transportation centers, convention centers, sporting venues, trade shows, etc.

EXAMPLE 5

Sales Employee Efficiency

The tracking system can track a mobile RFID sensor on a sales clerk to monitor the employee's actions throughout a workday. For example, mobile RFID sensors on sales clerks in proximity to electronic shadows of customers can indicate interaction time between the sales employees and customers. Such interaction time can be logged by the tracking system as an aid to maximize salesperson performance. Also, the tracking system can track a mobile RFID sensor on a sales clerk and mobile RFID sensors on products to monitor the time spent and efficiency for transferring inventory onto the retail floor.

EXAMPLE 6

Real-Time Inventory

The inherent electronic shadows can allow real-time inventory tracking, thereby providing cost savings in labor dollars. Real-time inventory also assures that the proper products are at the store in the proper location.

As discussed above, the tracking system of the present invention is preferably implemented with real-time software (e.g., middleware, firmware, application instructions). The tracking system may detect motion by various methods. For example, the tracking system may detect motion by positive location, where a target (e.g., tagged item) is seen by an antenna and moves within the sensor net. The tracking system may also detect motion by permanent absence, where a target in the sensor net disappears, with no associated shadow. In this scenario, the tracking system can presume any of the following and notify a nearby sales clerk: a) the tag went bad; b) the tag is causing interference; or c) something fell. The tracking system can further detect motion by absence with a shadow, where the tag disappears and there is a shadow blocking the tag that is seen when the shadow moves away, or the tag remains gone and an associated shadow moves. The tracking system can also detect motion of a person shadow, where a person creates an electronic shadow that is seen by an antenna and the person moves within the sensor net. Motion detection can be hindered by obstructions, which can be caused by shopping carts getting pushed around, store columns, display tables, merchandising objects (e.g., shelves). These obstructions can be obviated with the use of multiple antennas.

As described above, the tracking system in accordance with the preferred embodiments can detect theft. For example, theft may be detected by tracking a tag or a shadow motion vector towards an exit of non-purchased goods, especially if the tag/shadow does not first go through a point-of-sale. The tracking system can also detect theft by the sudden loss of tagged product (e.g., foil-lined booster bag, baby carriage, shopping bags), where the tag disappears in relationship to a shadow. The tracking system can non-invasively detect theft in a dressing room area, for example, where people disable tags in a dressing room, and an associated shadow leaves. Moreover, the tracking system can detect theft by swipe control at a point-of-sale. For example, where an employee does not scan all of the products into the register for sale, the tracking system can track the shadow associated with the products.

Depending on its use, the tracking system provides numerous measures of efficiency. For example, the tracking system can monitor the performance of sales clerks wearing RFID badges, since the tracking system recognizes if and how often the clerks are greeting and serving customers by integrating the RFID badges of the sales clerks with the shadows of the customers. In addition, the tracking system helps merchandising by checking if the goods and products are at their proper location. Moreover, the tracking system can monitor customer interaction, since the tracking system can non-invasively determine where the customer is. Further, the tracking system can monitor customer path flow, traffic patterns, linger patterns and acceptance rates. Such information can guide merchants on drawing customers into the shopping experience.

It will be appreciated by those skilled in the art that changes could be made to the embodiments described above without departing from the broad inventive concept thereof. For example, the embodiments could be modified to operate using other frequencies from the hertz band through the tera band to non-ionizing bands. Non-ionizing frequencies would work well as a coupling method differentiated by ionizing radiation as opposed to non-ionizing radiation. It is understood, therefore, that this invention is not limited to the particular embodiments disclosed, but it is intended to cover modifications within the spirit and scope of the present invention. Without further elaboration the foregoing will so fully illustrate my invention that others may, by applying current or future knowledge, readily adapt the same for use under various conditions of service.

What is claimed is:

1. A tracking system, comprising:
   an identification sensor positioned at a first location, said identification sensor having a responsive circuit;
   an antenna positioned at a second location to detect said identification sensor by interactive coupling between said antenna and said identification sensor via communication signals therebetween; and
   a processing member that determines an absence of detection of said identification sensor by said antenna, interprets the absence of detection as indicia of an electronic shadow between the first location and the second location, and infers a presence of an object as cause for the electronic shadow.

2. The tracking system of claim 1, further comprising a plurality of identification sensors, each of said plurality of identification sensors positioned at a respective location for detection by interactive coupling between each sensor and said antenna, wherein said processing member further determines an absence of detection of at least one of said plurality of identification sensors by said antenna, interprets the absence of detection as indicia of an electronic shadow between said antenna and said at least one of said plurality of identification sensors, and infers the presence of at least one object as cause for the electronic shadow.

3. The tracking system of claim 2, wherein said antenna periodically detects said plurality of identification sensors by repeated interactive coupling between said antenna and said identification sensors, and said processing member tracks movement of the object by monitoring movement of the electronic shadow.

4. The tracking system of claim 2, wherein each of said plurality of identification sensors is fixed.

5. The tracking system of claim 4, wherein said antenna detects a mobile identification tag adjacent the electronic shadow by interactive coupling between said antenna and the mobile identification tag, said processing member associating the mobile identification tag with the electronic shadow.

6. The tracking system of claim 5, wherein said processing member tracks movement of the mobile identification tag by monitoring movement of the associated electronic shadow.

7. The tracking system of claim 4, wherein said antenna further detects a mobile identification tag attached to a product by interactive coupling between said antenna and the mobile identification tag, said processing member associating the product with the electronic shadow.

8. The tracking system of claim 7, wherein said processing member tracks movement of the product by monitoring movement of the electronic shadow.

9. The tracking system of claim 7, wherein said processing member associates the product with a complimentary product related to the product, and further comprising a display device in communication with said processing member for advertising the complimentary product.

10. The tracking system of claim 1, further comprising a plurality of antennas, each of said plurality of antennas positioned at a respective fixed location for detecting said identification sensor by interactive coupling between said antennas and said identification sensor via communication signals therebetween, wherein said processing member determines an absence of detection of said identification sensor by at least one of said plurality of antennas, interprets the absence of detection as indicia of an electronic shadow between said identification sensor and said at least one of said plurality of antennas, and estimates a size of the object based on a detection or absence of detection of said identification sensor by said plurality of antennas.

11. The tracking system of claim 1, further comprising a plurality of identification sensors and a plurality of antennas, each of said plurality of identification sensors positioned at a respective fixed portion of the first location, each of said plurality of antennas positioned at a respective fixed portion of the second location for detecting at least one of said plurality of identification sensors by interactive coupling between said plurality of antennas and said plurality of identification sensor via communication signals therebetween, wherein said processing member determines an absence of detection of any of said plurality of identification sensors by at least one of said plurality of antennas, and interpret the absence of detection of said identification sensors as indicia of an electronic shadow between said identification sensors and said at least one of said antennas.

12. The tracking system of claim 11, wherein said processing member estimates a size of a footprint of the object as less than a size of the electronic shadow.

13. The tracking system of claim 1, wherein said processing member includes a computer.

14. The tracking system of claim 1, wherein said processing member includes a computer program.

15. The tracking system of claim 1, wherein the first location is in a floor and the second location is in a ceiling.

16. The tracking system of claim 1, wherein said identification sensor is an RFID sensor and said responsive circuit is a resonant rf circuit.

17. A tracking system, comprising:
   means for communicating signals along a line of sight between a first location and a second location;
   means for detecting the communicated signals at the second location;
   means for determining an absence of detection of one of the communicated signals at the second location;

means for interpreting the absence of detection as indicia of a shadow between the first location and the second location; and means for inferring a presence of an object as cause for the shadow.

18. The tracking system of claim 17, further comprising means for estimating a size of the object.

19. The tracking system of claim 17, further comprising means for monitoring movement of the shadow to track the object.

20. The tracking system of claim 17, further comprising means for detecting an identification tag, and means for associating the identification tag with the shadow.

21. The tracking system of claim 17, further comprising means for detecting an identification tag, means for associating the identification tag with a product, means for associating the product with a complimentary product related to the product, and means for advertising the complimentary product.

22. A method for targeting an object, comprising:
communicating signals along a line of sight between a first location and a second location;
detecting the communicated signals at the second location;
determining an absence of detection of one of the communicated signals at the second location;
interpreting the absence of detection as indicia of a shadow between the first location and the second location; and
inferring a presence of the object as cause for the shadow.

23. The method of claim 22, further comprising estimating a size of the object.

24. The method of claim 22, further comprising monitoring movement of the shadow to track the object.

25. The method of claim 24, further comprising sending an alarm based on the movement of the shadow.

26. The method of claim 22, further comprising detecting an identification tag, and associating the identification tag with the shadow.

27. The method of claim 22, further comprising detecting an identification tag, associating the identification tag with a product, associating the product with a complimentary product related to the product, and advertising the complimentary product.

28. The tracking system of claim 1, wherein the object is unknown to said tracking system.

29. The tracking system of claim 17, wherein the object is unknown to said tracking system.

30. The method of claim 22, wherein the inferring step infers a presence of the object that is an unknown object as cause for the shadow.

* * * * *